US012142774B2

(12) United States Patent
DeKeuster et al.

(10) Patent No.: US 12,142,774 B2
(45) Date of Patent: Nov. 12, 2024

(54) TERMINAL COVER

(71) Applicant: CPS Technology Holdings LLC, New York, NY (US)

(72) Inventors: Richard M. DeKeuster, Racine, WI (US); Xugang Zhang, Shorewood, WI (US)

(73) Assignee: CPS Technology Holdings LLC, New York, NY (US)

( * ) Notice: Subject to any disclaimer, the term of this patent is extended or adjusted under 35 U.S.C. 154(b) by 506 days.

(21) Appl. No.: 17/428,870

(22) PCT Filed: Feb. 7, 2020

(86) PCT No.: PCT/US2020/017207
§ 371 (c)(1),
(2) Date: Aug. 5, 2021

(87) PCT Pub. No.: WO2020/163712
PCT Pub. Date: Aug. 13, 2020

(65) Prior Publication Data
US 2022/0109205 A1    Apr. 7, 2022

Related U.S. Application Data

(60) Provisional application No. 62/803,008, filed on Feb. 8, 2019.

(51) Int. Cl.
*H01M 50/147*    (2021.01)
*H01M 50/543*    (2021.01)

(52) U.S. Cl.
CPC ....... *H01M 50/147* (2021.01); *H01M 50/543* (2021.01); *H01M 2220/20* (2013.01)

(58) Field of Classification Search
CPC ........... H01M 2220/20; H01M 50/147; H01M 50/543; Y02E 60/10
See application file for complete search history.

(56) References Cited

U.S. PATENT DOCUMENTS 5,576,516 A * 11/1996 Kameyama ......... H01M 50/562
439/522
2017/0125750 A1   5/2017 Tsukiyoshi
2018/0175342 A1   6/2018 Kim et al.

FOREIGN PATENT DOCUMENTS

CN    105794020 A    7/2016
CN    105934839 A    9/2016
(Continued)

OTHER PUBLICATIONS

International Search Report and Written Opinion of the International Searching Authority dated Apr. 30, 2020, for International Appln. No. PCT/US2020/017207 filed Feb. 7, 2020, 48 pages.
(Continued)

*Primary Examiner* — Victoria H Lynch
(74) *Attorney, Agent, or Firm* — Boardman & Clark LLP

(57) ABSTRACT

Disclosed herein is a battery system, comprising: a battery module comprising a housing; a battery terminal disposed on a first side of the housing of the battery module; and a cover disposed on the housing, wherein the cover comprises a battery terminal cover extending from the cover and configured to adjust between a first position and a second position, wherein the battery terminal cover, in the first position, is configured to at least partially shroud the battery terminal, and wherein the battery terminal cover, in the second position, is configured to expose the battery terminal.

9 Claims, 7 Drawing Sheets

(56) References Cited

FOREIGN PATENT DOCUMENTS

| DE | 4300567 A1 | 7/1994 |
| EP | 2421066 A1 | 2/2012 |
| KR | 1999 0043226 A | 6/1999 |
| KR | 20160072312 A | 6/2016 |

OTHER PUBLICATIONS

"Collection of EXPO Project Articles", by Shanghai Xian Dai Architectural Design (Group) Co., Ltd, Tianjin University Press, Apr. 30, 2010, pp. 129-131.

"Earthquake Proofing Technique of Light-Steel Construction in Towns", by Jihong YE, et al., Southeast University Press, Dec. 31, 2013, pp. 105-109.

\* cited by examiner

TERMINAL COVER

CROSS-REFERENCE TO RELATED APPLICATIONS

This application is a national phase filing of International Patent Application No. PCT/US2020/017207 entitled "Terminal Cover," which has an international filing date of Feb. 7, 2020, and claims the benefit of U.S. Provisional Patent Application No. 62/803,008 filed on Feb. 8, 2019, entitled "Terminal Cover," the entire contents of each of which is incorporated herein by reference for all purposes.

FIELD

The present disclosure relates generally to the field of batteries and battery modules. More specifically, the present disclosure relates to a battery module cover to be placed atop a battery module to protect components within the battery module.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved battery module components that are used in xEVs. For instance, certain battery modules may use a cover and/or a housing to protect and shroud certain components from objects, such as debris. Certain battery module covers and/or housings may protect components disposed within the battery module, such as battery cells, but expose other components disposed outside of the battery module, such as battery terminals. In this manner, the components remain exposed and are subject to contact with objects, which may affect a performance of the components and of the battery module.

SUMMARY

Disclosed are various embodiments of a terminal cover and battery system seeking to address the above-noted needs.

Disclosed herein is a battery system, comprising: a battery module comprising a housing; a battery terminal disposed on a first side of the housing of the battery module; and a cover disposed on the housing, wherein the cover comprises a battery terminal cover extending from the cover and configured to adjust between a first position and a second position, wherein the battery terminal cover, in the first position, is configured to at least partially shroud the battery terminal, and wherein the battery terminal cover, in the second position, is configured to expose the battery terminal. Disclosed is a battery system wherein the battery terminal cover comprises a cap, terminal cover walls extending from the cap, and a clip extending from the cap. Disclosed is a battery system wherein the battery terminal is disposed on a mount on the first side of the housing, wherein the mount comprises a wall coupled to the housing, and wherein the wall comprises an opening. Disclosed is a battery system wherein the clip is configured to insert into the opening when the battery terminal cover is in the first position. Disclosed is a battery system wherein the wall of the mount extends beyond a surface of the cap of the terminal cover when the terminal cover is in the first position. Disclosed is a battery system wherein the terminal cover walls and the clip are configured to surround the battery terminal when the terminal cover is in the first position. Disclosed is a battery system wherein the battery terminal cover is configured to adjust between the first position and the second position via rotation about a hinge.

Disclosed is a battery system wherein the cover comprises a first thickness, wherein the hinge comprises a second thickness, and wherein the first thickness is greater than the second thickness. Disclosed is a battery system wherein the battery terminal is a first battery terminal, wherein the battery terminal cover is a first battery terminal cover, wherein the battery system comprises a second battery terminal disposed on the first side of the housing, and wherein the cover comprises a second battery terminal cover configured to adjust between a third position and a fourth position, wherein the second battery terminal cover, in the third position, is configured to shroud the second battery terminal, and wherein the second battery terminal cover, in the fourth position, is configured to expose the second battery terminal. Disclosed is a battery system wherein the first battery terminal is a positive terminal and wherein the second battery terminal is a negative terminal. Disclosed is a battery system wherein a portion of the terminal is accessible when the battery terminal cover is installed in the first position. Disclosed is a battery system wherein a top surface of the terminal cover is not flush with a top surface of the cover when the terminal cover is installed in the first position.

Disclosed is a battery module cover comprising: a battery terminal cover configured to adjust between a first position and a second position, wherein the battery terminal cover, in the first position, is configured to at least partially shroud a battery terminal of the battery module, and wherein the battery terminal cover, in the second position, is configured to expose the battery terminal. Disclosed is a battery system wherein the battery terminal cover comprises a cap, terminal cover walls extending from the cap, and a clip extending from the cap. Disclosed is a battery system wherein the clip is configured to insert into an opening of the housing of the battery module when the battery terminal cover is in the first position. Disclosed is a battery system wherein terminal cover walls of the battery terminal cover and the clip are configured to partially surround the battery terminal when the terminal cover is in the first position. Disclosed is a battery system wherein the battery terminal cover is configured to adjust between the first position and the second position via rotation about a hinge. Disclosed is a battery system wherein the cover comprises a first thickness, wherein the hinge comprises a second thickness, and wherein the first thickness is greater than the second thickness. Disclosed is a battery system wherein a top surface of the terminal cover is not flush with a top surface of the cover when the terminal cover is installed in the first position.

These and other features and advantages of devices, systems, and methods are described in, or are apparent from, the following detailed descriptions and drawings of various examples of embodiments.

DRAWINGS

Various aspects of this disclosure may be better understood upon reading the following detailed description and upon reference to the drawings in which.

Figure 1:
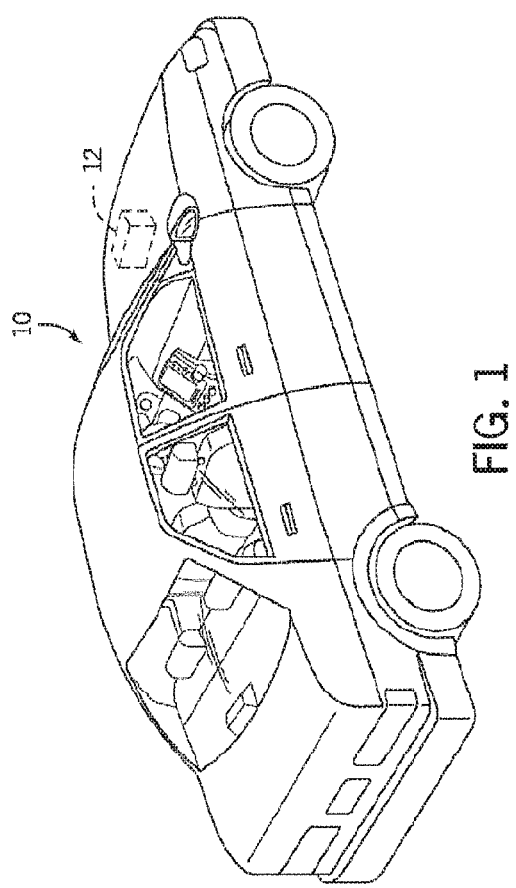
FIG. 1 is a perspective view of an xEV having a battery system configured in accordance with present embodiments to provide power for various components of the xEV, in accordance with an aspect of the present disclosure.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, certain battery modules may include a housing and/or a battery module cover to shroud internal components from debris that may affect a performance of the components. For instance, the battery module cover may shroud components that are located interior to the battery module housing, such as battery cells, while exposing other components that may be located exterior to the battery module housing. For example, a battery terminal of the battery module may be exposed to permit the battery terminal to electrically couple to other components and place the battery module in electrical communication with the other components (e.g., a battery system, a vehicle electrical bus). However, when the battery module is not in operation, a battery terminal may remain exposed and therefore, come into contact with unwanted debris that may affect the performance of a battery terminal.

In view of these and other considerations, it is now recognized that a need exists for covering a battery terminal while the battery module is not in operation. For example, the battery module cover may be modified to include a portion that is configured to cover the battery terminal. That is, when the battery terminal is not coupled to other components, such as during transportation of the battery module, the battery module cover may shroud the battery terminal and block unwanted debris from contacting the battery terminal. Additionally, the battery module cover may also be adjusted such that the battery terminal is exposed when desired, such as during operation of the battery module. In this manner, the battery module may be configured to shroud or unshroud the battery terminal based on if the battery terminal is to be coupled to other components.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufactures that generally produce traditional gas-powered vehicles may desire to utilize improved vehicle technologies (e.g., regenerative braking technology) within their vehicle lines. Often, these manufactures may utilize one of their traditional vehicle platforms as a starting point. Accordingly, since traditional gas-powered vehicles are designed to utilize 12 V battery systems, a 12 V lithium ion battery may be used to supplement a 12 V lead-acid battery. More specifically, the 12 V lithium ion battery may be used to more efficiently capture electrical energy generated during regenerative braking and subsequently supply electrical energy to power the vehicle's electrical system. Additionally, in a mHEV, the internal combustion engine may be disabled when the vehicle is idle. Accordingly, the 12 V lithium ion battery may be used to crank (e.g., restart) the internal combustion engine when propulsion is desired.

However, as advancements are made in vehicle technologies, high voltage electrical devices may be included in the vehicle's electrical system. For example, the lithium ion battery may supply electrical energy to an electric motor in a FHEV. Often, these high voltage electrical devices utilize voltages greater than 12 V, for example, up to 48, 96, or 130 V. Accordingly, in some embodiments, the output voltage of a 12 V lithium ion battery may be boosted using a DC-DC converter to supply power to the high voltage devices. Additionally, or alternatively, a 48 V lithium ion battery may be used to supplement a 12-volt lead-acid battery. More specifically, the 48 V lithium ion battery may be used to more efficiently capture electrical energy generated during regenerative braking and subsequently supply electrical energy to power the high voltage devices.

As set forth above, a battery terminal of the battery module may be exposed at all times, even if the battery module includes a battery module cover configured to shroud certain components of the battery module. The exposed battery terminal may come into contact with unwanted debris that may affect a performance of the battery module. For example, during transportation of the battery module, certain particles may contact the battery terminal and remain in contact when the battery terminal is electrically coupled to other components, such as a bus bar of the battery system. The particles may affect an electrical connection of the battery terminal to affect a performance of the battery module. As such, a battery module cover that includes an adjustable cover for the battery terminal may shroud the battery terminal when desired. As an example, the battery module cover may be adjusted to expose the battery terminal when coupling of the battery terminal is desired, such as during operation and/or installation of the battery module. The battery module cover may then be adjusted to cover the battery terminal when shrouding of the battery terminal is desired, such as during transportation of the battery module.

With the foregoing in mind, present embodiments relate to a battery module cover applied in particular battery systems employed in a xEV. For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
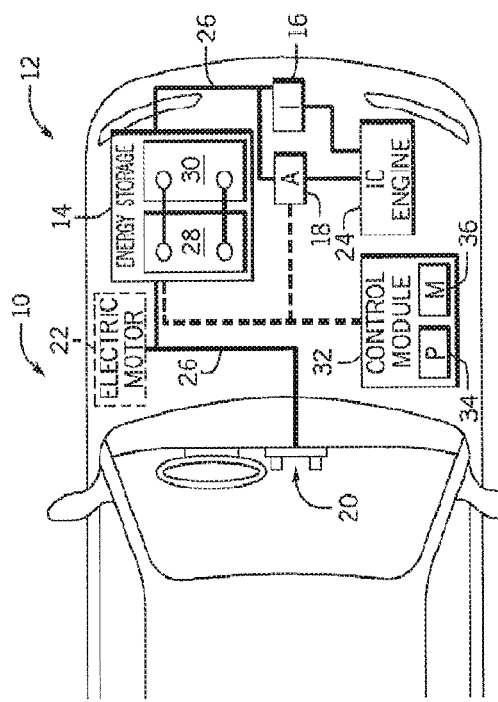
FIG. 2 is a cutaway schematic view of an embodiment of the xEV having a start-stop system that utilizes the battery system of FIG. 1, the battery system having a lithium ion battery module, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally, or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus may enable the energy storage component 14 to output electrical energy to the ignition system 16 and/or the vehicle console 20. Accordingly, when a 12-volt battery system 12 is used, the bus 26 may carry electrical power typically between 8-18 V.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Accordingly, the control unit 32 may include one or more processors 34 and one or more memory units 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random-access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Figure 3:
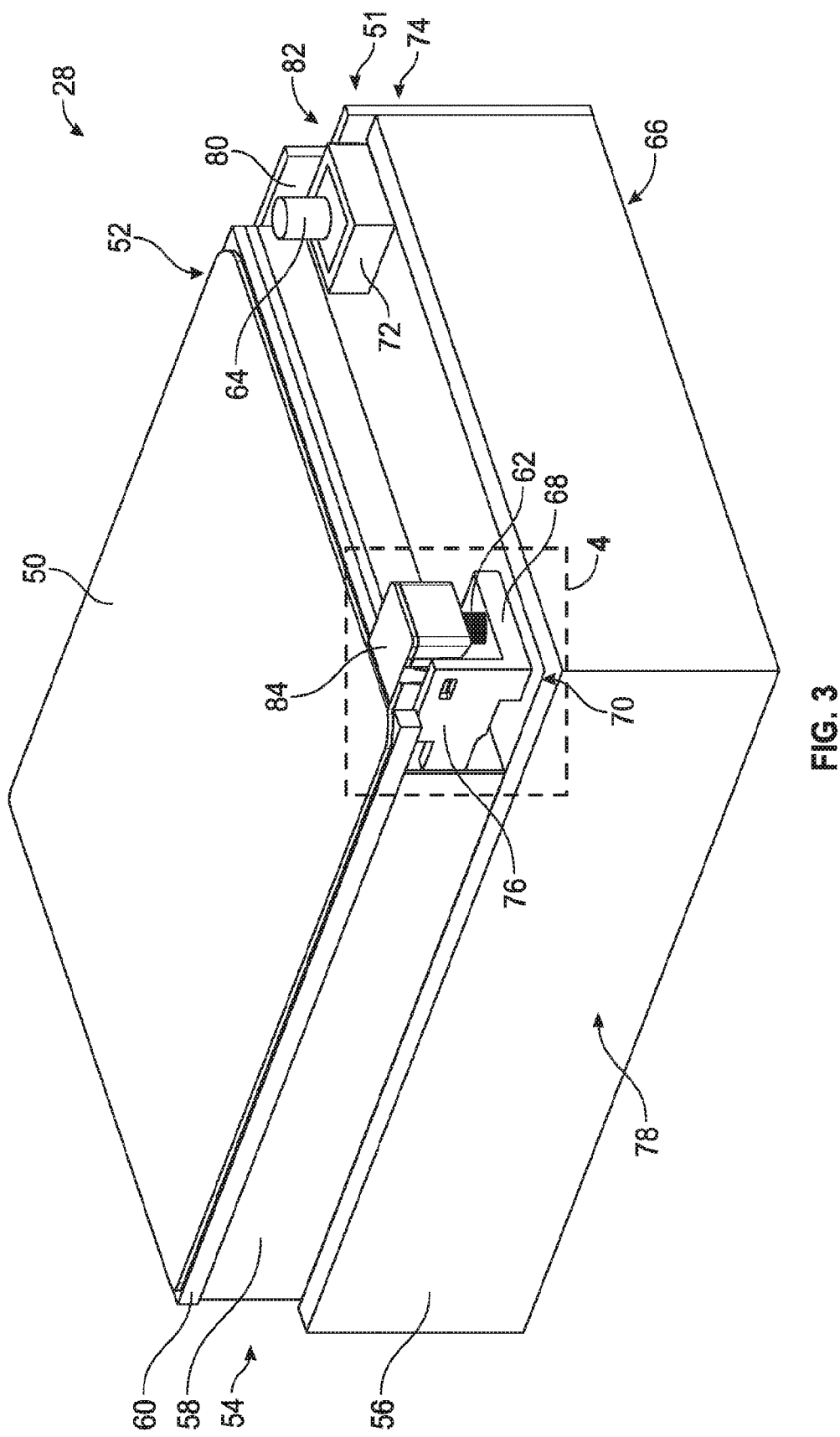
FIG. 3 is a perspective view of an embodiment of a battery module with a cover configured to shroud a battery terminal, in accordance with an aspect of the present disclosure.

A more detailed view of the battery module 28 is illustrated in FIG. 3, which is a perspective view of the battery module 28 including a cover 50 positioned on a battery module housing 51. As shown in FIG. 3, the cover 50 may be disposed at a first side 52 of the battery module housing 51, such as over a raised section 54 of the battery module housing 51. The raised section 54 may extend from a base 56 of the battery module housing 51 and include a middle section 58 and an outer section 60. The cover 50 may be disposed over and contact the outer section 60.

The battery module 28 may include components, such as battery cells, that are located interior to the cover 50 and the battery module housing 51. In this manner, the cover 50 and the battery module housing 51 shroud the components from an ambient environment. The battery module 28 may also include components that are located exterior to the cover 50 and the battery module housing 51. As an example, the battery module 28 includes a first terminal 62 and a second terminal 64. In some embodiments, the first terminal 62 is a positive terminal and the second terminal 64 is a negative terminal. The first terminal 62 and the second terminal 64 may be located adjacent to a second side 66 of the battery module 28. The first terminal 62 may be disposed atop a first mount 68 disposed at a first corner 70 of the battery module 28 and the second terminal 64 may be disposed atop a second mount 72 at a second corner 74 of the battery module 28. The first mount 68 may be coupled to the middle section 58 and the base 56 and may include a first wall 76. The first wall 76 may extend from the middle section 58 at a third side 78 of the battery module 28 towards the second side 66 of the battery module 28 to shroud all or a portion of the first terminal 62 from the third side 78. The second mount 72 may include a second wall 80 that extends from the middle section 58 toward the second side 66 at a fourth side 82 of the battery module 28 opposite the third side 78. Thus, the second wall 80 shrouds all or a portion of the second terminal 64 from the fourth side 82.

As illustrated in FIG. 3, to further shroud the first terminal 62, the cover 50 includes a terminal cover 84. By way of example, the terminal cover 84 extends from the cover 50 proximate to the second side 66 and is adjacent to the first wall 76. The terminal cover 84 may be of the same material as a remainder of the cover 50. As an example, the cover 50 may include material to insulate electrical components of the battery module 28 and thus, may be formed from an insulative material such as a nonconductive polymer, a nonconductive composite, carbon fiber, or another suitable material, or any combination thereof. In certain embodiments, the cover 50 is formed via a molding process and thus, the terminal cover 84 may also be formed during the same molding process.

Figure 4:
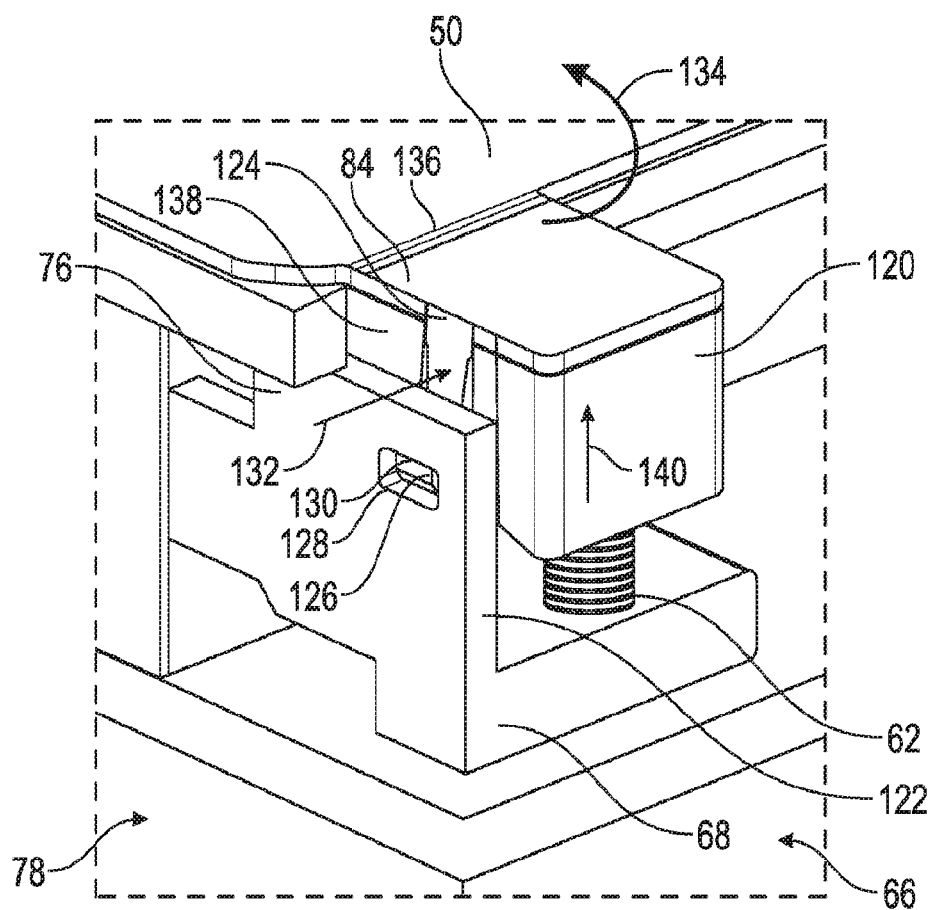
FIG. 4 is an expanded perspective view of an embodiment of the cover of FIG. 3 configured to shroud a battery terminal, in accordance with an aspect of the present disclosure.

To further illustrate details of the terminal cover 84, FIG. 4 is an expanded perspective view of the terminal cover 84 shrouding the first terminal 62. As indicated in FIG. 4, the terminal cover 84 extends from the cover 50 towards the second side 66. In certain embodiments, a first surface 120 of the terminal cover 84 is substantially flush with a second surface 122 of the mount 68. In this manner, the first wall 76 shrouds at least a portion of the terminal cover 84 from the third side 78. Furthermore, as mentioned, the terminal cover 84 may be adjustable to shroud and expose the first terminal 62 as desired. For example, the terminal cover 84 may include a first position to cover the first terminal 62, as illustrated in FIGS. 3 and 4, and a second position to expose the first terminal 62. To secure the terminal cover 84 in the first position, the terminal cover 84 may include a clip 124. The clip 124 may include a hook 126 configured to insert into an opening 128 of the first wall 76. In this manner, when the terminal cover 84 is in the first position, the hook 126 abuts an inner surface 130 of the opening 128 to block movement of the terminal cover 84.

Figure 5:
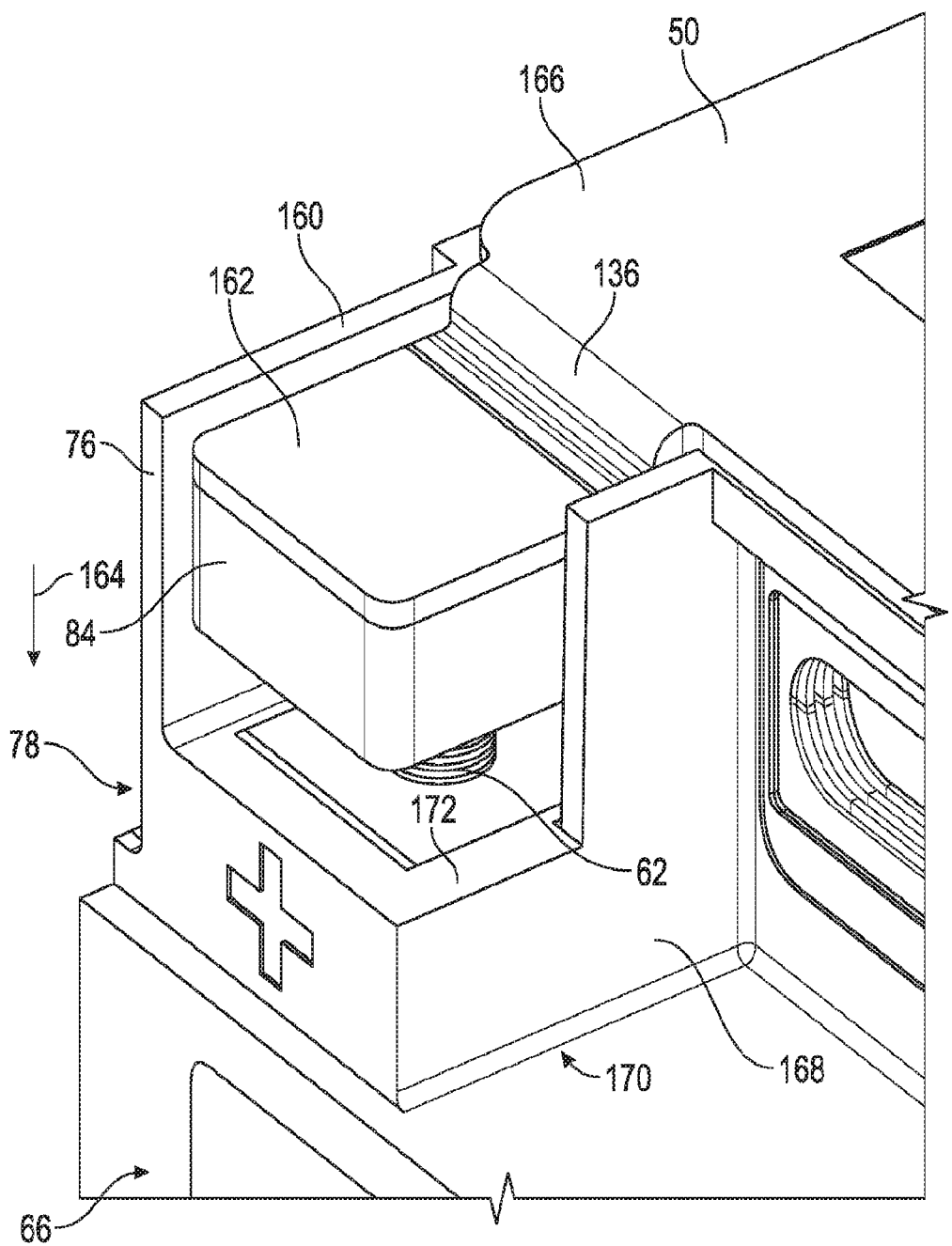
FIG. 5 is an expanded perspective view of another embodiment of the cover of FIG. 3 configured to shroud a battery terminal, in accordance with an aspect of the present disclosure.

It should be understood the terminal cover 84 may not fully shroud the terminal 62 as shown in FIG. 4 and FIG. 5. In this way, the terminal cover 84 may have advantages to installation within a vehicle. For example, terminal cover 84 may allow for installation within a vehicle, allowing for connection components (not shown)—such as, but not limited to, a terminal ring—to be maintained within the open space for accessing the terminal 62. Terminal cover 84 may thereby have advantages to the installation process by being integrated with the cover 50. As a non-limiting example, the disclosed may allow for a single component for installation rather than having a separate terminal cover which may be lost.

To adjust the terminal cover 84 into the second position to expose the first terminal 62, a force may be imparted onto the clip 124, such as in a first direction 132, to remove the hook 126 from the opening 128. As such, the hook 126 no longer abuts the inner surface 130 and thus, the terminal cover 84 is permitted to rotate in a second direction 134 about a hinge 136. In some embodiments, the terminal cover 84 may include additional components configured to keep the terminal cover 84 in the second position, such as an additional hook to insert into another opening when the terminal cover 84 is in the second position.

As mentioned, the first wall 76 shrouds the terminal cover 84 on the third side 78. However, a portion 138 of the terminal cover 84 may remain exposed on the third side 78. In certain embodiments, the first wall 76 may extend in a third direction 140 to shroud the portion 138 as well. To illustrate, FIG. 5 is an expanded perspective view of the terminal cover 84, where the first wall 76 is configured to completely shroud the terminal cover 84 from the third side 78. That is, the first wall 76 is extended such that a third surface 160 of the first wall 76 is extended beyond a fourth surface 162 of the terminal cover 84. In some embodiments, the hinge 136 may offset the terminal cover 84 in a fourth direction 164 such that the fourth surface 162 is offset from a fifth surface 166 (e.g., an uppermost surface) of the cover 50. In this manner, the terminal cover 84 is inserted deeper within the first wall 76 to shroud the terminal cover 84. In other words, a top surface of the terminal cover 162 is not flush with the plane of a top surface 166 of the cover 50. More specifically, a top surface of the terminal cover 162 is below the plane of a top surface 166 of the cover 50.

As illustrated in FIG. 5, the mount 68 includes a third wall 168 that may shroud a fifth side 170 of the terminal cover 84. In some embodiments, the third wall 168 may extend towards the second side 66. There may also be an additional wall disposed on the second side 66 to shroud the terminal cover 84 from the second side 66. However, it should be appreciated that there may be a gap 172 between the walls of the mount 68 to permit components, such as a cable, to be inserted into the mount 68 and couple to the first terminal 62.

Figure 6:
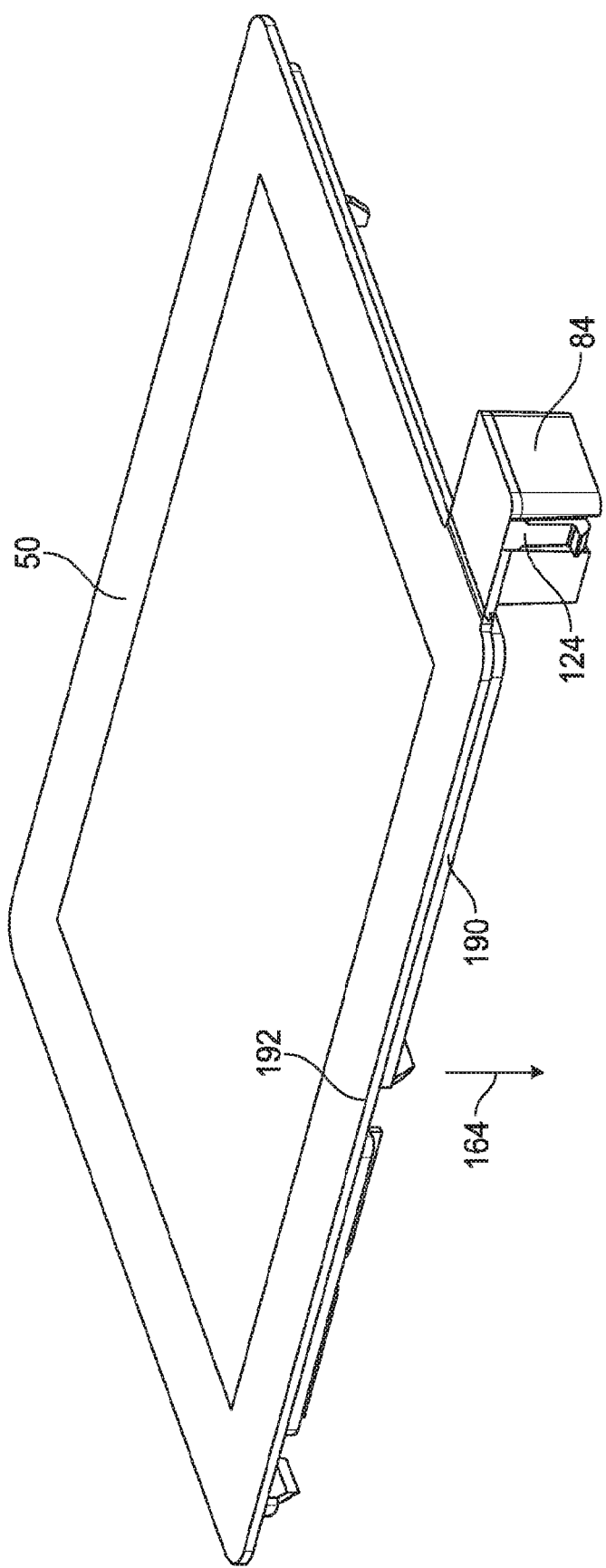
FIG. 6 is a perspective view of an embodiment of the cover of FIG. 3, in accordance with an aspect of the present disclosure.

In certain embodiments, the cover 50 may be adjustably coupled to the battery module 28. FIG. 6 illustrates a perspective view of the cover 50 removed from the battery module 28. As shown in FIG. 6, when the cover 50 is removed, the terminal cover 84 is also removed from covering the first terminal 62. That is, the clip 124 of the terminal cover 84 may be uncoupled from the opening 128 of the first wall 76 such that the terminal cover 84 may be removed from the first wall 76. To secure the cover 50 onto the battery module 28, the cover 50 may include ledges 190 that are offset from an outer perimeter 192 of the cover 50 and extending in the fourth direction 164. In this manner, the ledges 190 may be inserted into the outer surface 60 and block movement of the cover 50 when the cover 50 is coupled to the battery module 28.

Figure 7:
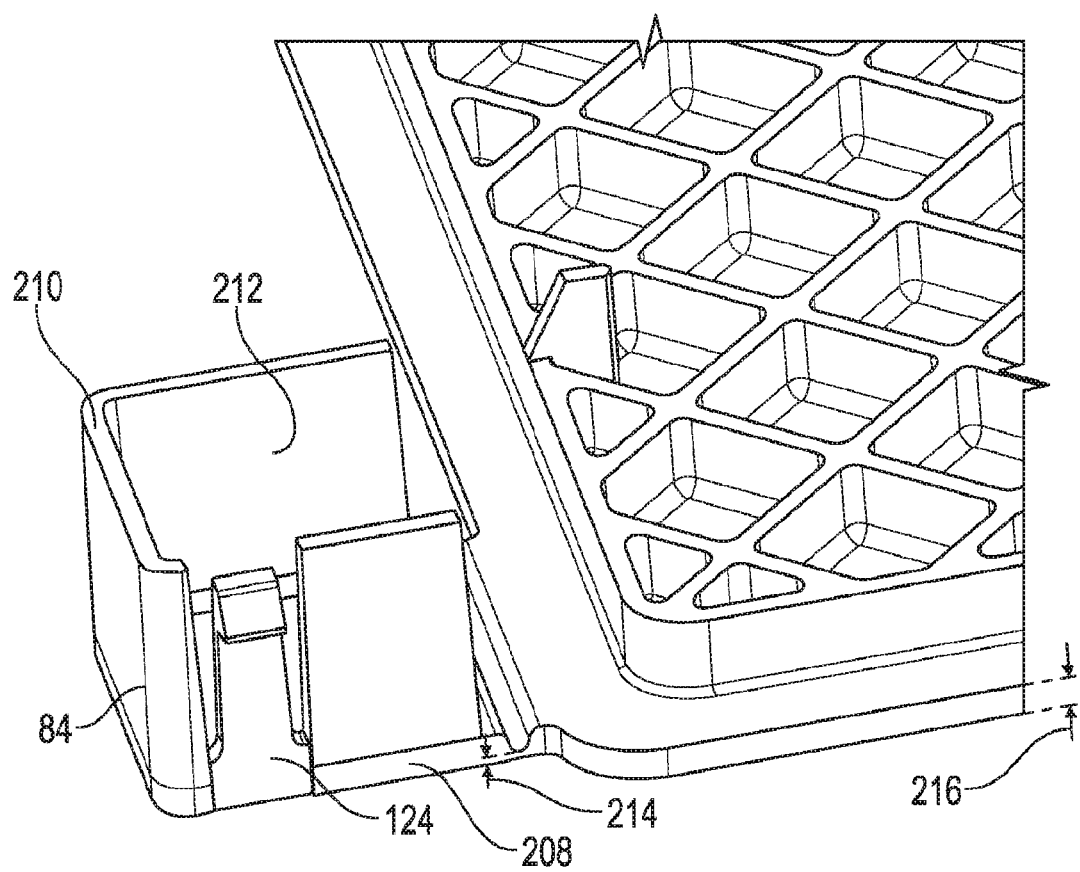
FIG. 7 is a perspective view of the cover of FIGS. 3 and 6 configured to shroud a battery terminal, in accordance with an aspect of the present disclosure.

A detailed view of the terminal cover 84 is further illustrated in FIG. 7, which is a perspective view of an underside of the terminal cover 84. As indicated in FIG. 7, the terminal cover 84 includes a cap 208 and terminal cover walls 210 extending from the cap 208 and surrounding a space 212. When the terminal cover 84 is in the first position, the first terminal 62 is configured to be positioned within the space 212 of the terminal cover 84 such that the cap 208 and the terminal cover walls 210 shroud the first terminal 62. The terminal cover walls 210 may be substantially rigid to block movement when coming into contact with external objects, such as debris. However, the clip 124, which may be separate from the terminal cover walls 210, may be less rigid to permit the clip 124 to move more easily than the terminal cover walls 210, which enables the clip 124 to couple to and decouple from the opening 128.

To allow the terminal cover 84 to adjust between the first position and the second position, a thickness 214 of the hinge 136 may be substantially thinner than a thickness 216 of the remainder of the cover 50. In this manner, the hinge 136 is more flexible and permits movement of the terminal cover 84 about the hinge 136. In certain embodiments, the hinge 136 may also include segments that may each permit some movement between them. Together, the segments may permit a full range of motion for the terminal cover 84 to rotate about the hinge 136. In various embodiments, hinge 136 may be a living hinge. As a non-limiting example, hinge 136, terminal cover 84, and cover 50 may all be formed of the same material, including but not limited to, a plastic. Hinge 136 may also allow for upward and downward flexing of the terminal cover 84 when in first and second positions.

As set forth above, the terminal cover 84 may be formed along with the cover 50 via molding. However, in additional or alternative embodiments, the terminal cover 84 and/or the cover 50 may be formed via other methods. It should be appreciated that the terminal cover 84 may be separate from the cover 50 and thus, may be coupled to the cover 50, such as via a weld (e.g., ultrasonic, hot plate laser weld), adhesives, or any appropriate fastener, while still permitting rotation of the terminal cover 84. In this manner, the terminal cover 84 may be coupled to a cover without an existing terminal cover, for example by retrofitting. Additionally, although FIGS. 3-7 illustrate the terminal cover 84 as including a rectangular shape, it should be understood that the terminal cover 84 may include any suitable shape to shroud the first terminal 62. It should also be understood that in additional or alternative embodiments, the terminal cover 84 may adjust between the first position and the second position in another method, such as via sliding. Such methods would permit the terminal cover 84 to expose the first terminal 62 without detaching from the cover 50.

In certain embodiments, the cover 50 may include an additional terminal cover 84 (or additional feature cover) configured to cover the second terminal 64 or another component located outside of the battery module 28. The additional terminal cover 84 may be configured in any of the aforementioned ways and may include a different configuration than the terminal cover 84 configured to shroud the first terminal 62. For example, it may be useful for the additional terminal cover to have a different shape so that the different terminals of the battery module 28 can be readily distinguished.

Moreover, although this disclosure primarily discusses applying a force on the clip 124 of the terminal cover 84 to adjust the terminal cover 84 between the first and second position, in certain embodiments, the terminal cover 84 may be automatically adjusted between the first and second position. Indeed, in some embodiments, the terminal cover 84 may be configured to shroud the first terminal 62 when the battery module 28 is not in operation and the terminal cover 84 may be configured to expose the first terminal 62 when the battery module 28 is in operation. Thus, the position of the terminal cover 84 may depend on operation of the battery module 28, or on other operating parameters of the battery module 28. In such embodiments, adjustment of the terminal cover 84 may be performed via the control module 32, for example.

One or more of the disclosed embodiments, alone or on combination, may provide one or more technical effects including a battery module cover that is configured to adjust positions to cover and uncover a battery terminal of a battery module. For example, the battery module cover includes a portion that extends over the battery terminal and is configured to adjust positions to shroud and unshroud the battery terminal. The portion may include a clip that secures the portion to a wall of a mount of the battery terminal when shrouding the battery terminal to maintain coverage of the battery terminal. When unshrouding the battery terminal, the portion may be unclipped and rotated about a hinge to expose the battery terminal.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present disclosure.

While particular examples of embodiments are outlined above, various alternatives, modifications, variations, improvements and/or substantial equivalents, whether known or that are or may be presently foreseen, may become apparent to those having at least ordinary skill in the art. Accordingly, the examples of embodiments as set forth above are intended to be illustrative, not limiting. Various changes may be made without departing from the spirit or scope of the disclosure. Therefore, the disclosure is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A battery system, comprising:
   a battery module comprising a housing;
   a battery terminal disposed on a mount on a first side of the housing of the battery module, wherein the mount comprises a wall coupled to the housing, and wherein the wall comprises an opening; and
   a cover disposed on the housing, wherein the cover comprises a battery terminal cover extending from the cover and configured to adjust between a first position and a second position, wherein the battery terminal cover comprises a cap, terminal cover walls extending from the cap, and a clip extending from the cap, wherein the battery terminal cover, in the first position, is configured to at least partially shroud the battery terminal, and wherein the battery terminal cover, in the second position, is configured to expose the battery terminal, and wherein the wall of the mount extends beyond a surface of the cap of the battery terminal cover when the battery terminal cover is in the first position.

2. The battery system of claim 1, wherein the clip is configured to insert into the opening when the battery terminal cover is in the first position.

3. The battery system of claim 1, wherein the terminal cover walls and the clip are configured to surround the battery terminal when the battery terminal cover is in the first position.

4. The battery system of claim 3, wherein a portion of the battery terminal is accessible when the battery terminal cover is installed in the first position.

5. The battery system of claim 1, wherein the battery terminal cover is configured to adjust between the first position and the second position via rotation about a hinge.

6. The battery system of claim 5, wherein the cover comprises a first thickness, wherein the hinge comprises a second thickness, and wherein the first thickness is greater than the second thickness.

7. The battery system of claim 1, wherein the battery terminal is a first battery terminal, wherein the battery terminal cover is a first battery terminal cover, wherein the battery system comprises a second battery terminal disposed on the first side of the housing, and wherein the cover comprises a second battery terminal cover configured to adjust between a third position and a fourth position, wherein the second battery terminal cover, in the third position, is configured to shroud the second battery terminal, and wherein the second battery terminal cover, in the fourth position, is configured to expose the second battery terminal.

8. The battery system of claim 7, wherein the first battery terminal is a positive terminal and wherein the second battery terminal is a negative terminal.

9. The battery system of claim 1, wherein a top surface of the battery terminal cover is not flush with a top surface of the cover when the battery terminal cover is installed in the first position.

* * * * *